Patented July 19, 1949

2,476,443

UNITED STATES PATENT OFFICE 2,476,443

LOWER ALKYL ESTERS OF α-PHENYLACET-AMIDO-β-ACYLOXYACRYLIC ACID AND PROCESS FOR PREPARING THE SAME

Stanton A. Harris, Westfield, N. J., Carl H. Hoffman, Madison, Wis., and Karl Folkers, Plainfield, N. J., assignors to Merck & Co., Inc., Rahway, N. J., a corporation of New Jersey No Drawing. Application January 2, 1947, Serial No. 719,920

2 Claims. (Cl. 260—471)

This invention relates to certain new chemical compounds and to processes for preparing the same. More particularly the invention is concerned with esters of α-phenylacetamido-β-acyloxyacrylic acid and to the preparation thereof from the alkali metal salts of esters of α-phenylacetamido-β-hydroxyacrylic acid.

These compounds are useful as intermediates in the preparation of organic compounds such as serine, and particularly in the synthesis of penicillin and compounds having penicillin-like activity.

Regarded in certain of its broader aspects the process in accordance with the present invention involves reacting an alkali metal salt of an ester of α-phenylacetamido-β-hydroxyacrylic acid with an acyl halide to form an ester of α-phenylacetamido-β-acyloxyacrylic acid. This reaction can be represented graphically as follows:

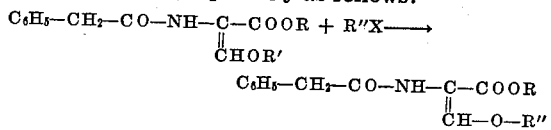

wherein R represents a lower alkyl substituent, R' represents an alkali metal, such as sodium and potassium, R'' represents an acyl substituent and X is halogen.

The starting material, the sodium salt of an ester of α-phenylacetamido-β-hydroxyacrylic acid, which has been referred to as an ester of sodio-formyl phenaceturic acid and as the sodium salt of methyl penaldate G, can be prepared by reacting an alkyl ester of phenaceturic acid with an alkyl formate and a sodium alkoxide in an inert anhydrous organic solvent. This process is fully described in our joint application, Harris, Arth, Hoffman and Folkers, Serial No. 636,516, filed December 21, 1945.

In accordance with a preferred embodiment of the present invention crude sodium salt of methyl ester of α-phenylacetamido-β-hydroxyacrylic acid and benzoyl chloride are reacted in an ethyl ether medium. This reaction is alkaline. However in the event that the sodium salt is impure and an excess of benzoyl chloride is necessary, an alkali metal carbonate may be added to prevent the reaction from becoming acidic. A mixture of the methyl ester of α-phenylacetamido-β-benzoyloxyacrylic acid, is recovered. Although the product obtained by this process can be used directly in many reactions, further purification may be desirable or necessary. This may be accomplished by recrystallizing the crude product from an ethyl acetate-ethanol mixture. Further recrystallization can be made from Cellosolve, methyl Cellosolve, ethyl acetate and methanol.

The following examples illustrate a method of carrying out the present invention, but it is to be understood that these examples are given by way of illustration and not of limitation.

Example 1

A suspension of 430 g. of crude sodium salt of the methyl ester of α-phenylacetamido-β-hydroxyacrylic acid and 40 g. of potassium carbonate in 700 ml. of ethyl ether was stirred vigorously and 125 ml. of benzoyl chloride added during an hour. The mixture was stirred for an additional three hours and then filtered. The solid residue namely a mixture of the methyl ester of α-phenylacetamido - β - benzoyl - oxyacrylic acid, sodium chloride and other insoluble materials, was washed with water and sucked nearly dry. Recrystallization from an ethyl acetate-ethanol mixture resulted in a material melting at 165–170° C. Many recrystallizations from Cellosolve, methyl Cellosolve, ethyl acetate and methanol yielded white material of constant melting point 172–173° C. (corr. micro-block).

Analysis calcd. for $C_{19}H_{17}O_5N$: C, 67.24; H, 5.05; N, 4.13. Found: C, 67.20; H, 5.19; N, 4.30, 4.20.

Example 2

A suspension of 220 g. of the sodium salt of the methyl ester of α-phenylacetamido-β-hydroxyacrylic acid in 1050 ml. of ether was stirred vigorously and 140 g. of benzoyl chloride added. The mixture was filtered and the residue containing methyl ester of α-phenylacetamido-β-benzoyloxyacrylic acid washed with water and sodium bicarbonate solution. The product was then recrystallized from methanol.

Modifications may be made in carrying out the present invention without departing from the spirit and scope thereof and the invention is to be limited only by the appended claims.

We claim:

1. Methyl ester of α-phenylacetamido-β-benzoyloxyacrylic acid.

2. The process for preparing the methyl ester of α-phenylacetamido-β-benzoyloxyacrylic acid which comprises reacting the methyl ester of the sodium salt of α-phenylacetamido-β-hydroxyacrylic acid with benzoyl chloride.

STANTON A. HARRIS.
CARL H. HOFFMAN.
KARL FOLKERS.

(References on following page)

REFERENCES CITED

The following references are of record in the file of this patent:

Dept. of Agriculture, "Report on Penicillin" No. 5, April 10, 1944, pages 2 and 3 (Sept. 27, 1945).

Dept. of Agriculture, "Report on Penicillin" No. 8, July 12, 1944, page 10 (Sept. 27, 1945).

University of Michigan, "Studies on Synthesis of Penicillin and Related Compounds" Report No. 7, Aug. 1, 1944, page 1, (Sept. 27, 1945).

Squibb, "Synthesis of Penicillin," Report XV, May 1, 1944, page 4 (Sept. 27, 1945).

Squibb, "Synthesis of Penicillin," Report XX, June 1, 1944, page 6, (Sept. 27, 1945).

Squibb, "Synthesis of Penicillin," Report 27, Sept. 1, 1944, page 6, (Sept. 27, 1945).

(Above reports available in Division 59)